(12) United States Patent
Schöning et al.

(10) Patent No.: US 8,266,351 B2
(45) Date of Patent: Sep. 11, 2012

(54) SYSTEM AND METHOD FOR SECURE COMPLEX EVENT PROCESSING IN HETEROGENEOUS ENVIRONMENTS

(75) Inventors: Harald Schöning, Dieburg (DE); Heiko Weber, Pfungstadt (DE); Michael Gesmann, Darmstadt (DE); Juliane Harbarth, Griesheim (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 12/929,292

(22) Filed: Jan. 12, 2011

(65) Prior Publication Data

US 2012/0166688 A1 Jun. 28, 2012

(30) Foreign Application Priority Data

Dec. 23, 2010 (EP) ..................... 10196788

(51) Int. Cl.
*G06F 13/12* (2006.01)
*G06F 15/173* (2006.01)

(52) U.S. Cl. .......................... 710/62; 709/238

(58) Field of Classification Search ............... 710/62; 709/238
See application file for complete search history.

(56) References Cited

U.S. PATENT DOCUMENTS

| | | | |
|---|---|---|---|
| 2010/0125545 A1* | 5/2010 | Navas | 707/602 |
| 2010/0125562 A1 | 5/2010 | Nair et al. | |
| 2010/0125584 A1* | 5/2010 | Navas | 707/747 |
| 2011/0060496 A1* | 3/2011 | Nielsen et al. | 701/33 |
| 2011/0178775 A1* | 7/2011 | Schoning et al. | 702/190 |

OTHER PUBLICATIONS

Nicolas Anciaux et al., "Querying and Aggregating Visible and Hidden Data Without Leaks," Dans Journées Bases de Données Avancées, BDA 2007 [retrieved Aug. 26, 2011]. http://www-smis.inria.fr/~anciaux/Nicolas%20Anciaux_files/Papers/NC3-ABBPS07b.pdf.
Event Processing Glossary—Version 1.1. Event-Processing Technical Society (EP-TS) Jul. 2008 [retrieved Aug. 26, 2011] http://www.ep-ts.com/component/option,com_docman/task,doc_download/gid,66/Itemid,84/.
Ontology. Encyclopedia of Database Systems. Ling Liu and M. Tamer Ozsu (Eds.), Springer-Verlag, 2009 [retrieved Aug. 26, 2011] http://tomgruber.org/writing/ontology-definition-2007.htm.
Dr. Michael Gessman, "BRITE: Interoperabilität durch Ontologien," Koblenzer Wirtschaftsinformatik-Forum, Jun. 19, 2008 [retrieved Aug. 26, 2011] http://www.uni-koblenz-landau.de/koblenz/fb4/institute/iwvi/wi-forum/wi_forum/interoperabilitat-durch-ontologien-eu-forschungsprojekt-brite.
Ludger van Elst et al., "Business Register Interoperability Throughout Europe: The BRITE Project," http://citeseerx.ist.psu.edu/viewdoc/download?doi=10.1.1.68.446&rep=rep1&type=pdf [retrieved Aug. 26, 2011].

* cited by examiner

*Primary Examiner* — Hyun Nam
(74) *Attorney, Agent, or Firm* — Nixon & Vanderhye PC

(57) ABSTRACT

Certain example embodiments relate to a system for secure complex event processing (CEP). The system includes an input adaptor configured to receive at least one input event from at least one external source system. The at least one input event comprises at least one event-specific disclosure permission concerning data of the input event. A CEP engine is configured to process the at least one input event and to produce at least one corresponding complex output event. A security enforcer is configured to remove data from the at least one output event that is not in accordance with the at least one event-specific disclosure permission defined in the corresponding at least one input event. An output adaptor is configured to send the at least one output event to at least one external target system.

14 Claims, 1 Drawing Sheet

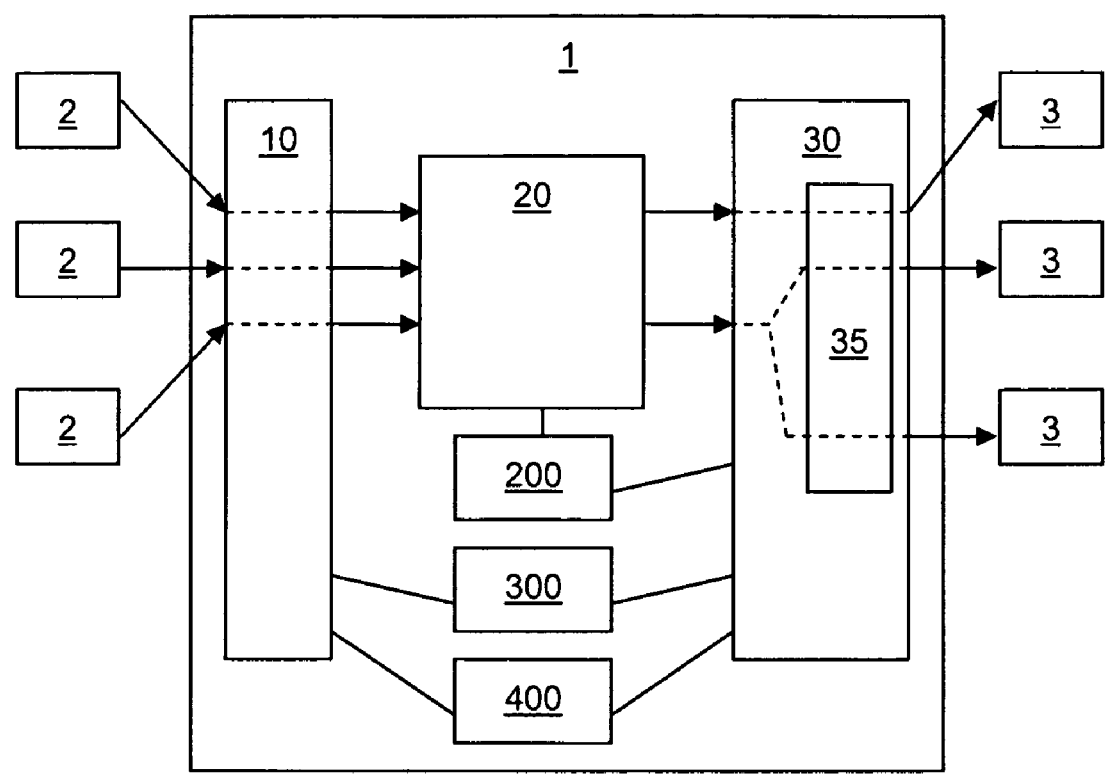

SYSTEM AND METHOD FOR SECURE COMPLEX EVENT PROCESSING IN HETEROGENEOUS ENVIRONMENTS

This application claims priority to EP Application No. 10 196 788.3 filed 23 Dec. 2010, the entire contents of which is hereby incorporated by reference.

1. TECHNICAL FIELD

The present invention relates to a system and a corresponding method for secure complex event processing in heterogeneous environments.

2. THE PRIOR ART

Modern computer systems typically comprise a plurality of different sub-systems connected in a network, wherein the sub-systems may be distributed over wide geographical areas and/or be under the control of different authorities. Such sub-systems are typically heterogeneous, i.e. they may employ different hardware, software, operating systems, programming languages and/or support different messaging concepts, security concepts, and the like. Further, each sub-system is typically autonomous, but nevertheless these loosely-coupled sub-systems have to cooperate in order to achieve a certain overall processing task. In particular, each sub-system may occasionally publish certain data/events that are of interest to the other sub-systems.

In the prior art, there is a need to analyze and aggregate the individual events published by the variety of sub-systems, so that certain patterns may be recognized that would not be observable when assessing each sub-system individually. This is particularly a concern of a modern data processing paradigm called complex event processing (CEP).

In this context, the individual sub-systems' events may be used to detect time- and/or security-critical complex events and for generating corresponding alerts and/or error messages. A typical application scenario is a facility surveillance system, where streams of data items captured by a card reader sub-system and multiple other sub-systems (such as an alarm system) have to be processed in order to identify unauthorized access to confidential areas within the facility or other abnormal behavior. Further application scenarios include road traffic management, location tracking, medical monitoring, manufacturing processes, network traffic monitoring and fraud detection.

However, as mentioned above, the individual sub-systems, each contributing one or more "mosaic pieces" to the overall complex event to be recognized, are typically independent of each other and most likely under the control of different enterprises or authorities. As a result, the sub-systems might have concerns to disclose all or interesting parts of the data contained in their respective events outside of the respective sub-system. On the other hand, some of the not to be disclosed information in the events might be crucial for certain types of evaluations and complex event recognition. Thus, individual security-concerns typically prevent or limit a fruitful CEP analysis.

Complex Event Processing (CEP) as a technology for analyzing data in events based on rules is available from various commercial vendors. The analysis is typically performed via query languages similar to the query languages known from traditional database applications. Access permissions on the sets of data are typically also modelled according to access models for traditional database systems, however, they do not take into account the individual security and confidentiality concerns of heterogeneous sub-systems that produce the individual events to be analyzed.

In the field of conventional database technology, database systems are available that provide mechanisms for modelling access permissions on various levels. For example, the Tamino XML Server of applicant provides a security concept that allows to model access permissions both on a data type level and on a data instance level. However, since such technologies are designed for centralized database systems, they are not suitable for heterogeneous distributed sub-systems, as concerned by the present invention.

In the context of data security and confidentiality, there are a number of scientific approaches available that deal with analyzing public and non-public data (e.g. Anciaux, N., Benzine, M., Bouganim, L., Pucheral, P., Shasha, D.: *Querying and Aggregating Visible and Hidden Data Without Leaks*. Dans Journées Bases de Données Avancées, BDA 2007).

However, these approaches typically focus on separating the data and evaluating the distinct separated portions of data in separated contexts in order to not disclose the non-public information in one central place. This, however, conflicts with complex event processing applications, since a meaningful analysis of noteworthy patterns is hardly possible when the event data is separated into distinct portions and thus cannot be analyzed as a whole.

It is therefore the technical problem underlying the present invention to provide an approach for complex event processing within the context of heterogeneous computing systems which is secure, i.e. which ensures that the sub-systems keep control of which information is disclosed to third parties, thereby at least partly overcoming the above explained disadvantages of the prior art.

3. SUMMARY OF THE INVENTION

This problem is according to one aspect of the invention solved by a system for secure complex event processing (CEP). In the embodiment of claim 1, the system comprises:

a. an input adaptor, adapted for receiving at least one input event from at least one external source system, wherein the at least one input event comprises at least one event-specific disclosure permission concerning data of the input event;

b. a CEP engine, adapted for processing the at least one input event and for producing at least one corresponding complex output event;

c. a security enforcer, adapted for removing data from the at least one output event that is not in accordance with the at least one event-specific disclosure permission defined in the corresponding at least one input event; and d. an output adaptor, adapted for sending the at least one output event to at least one external target system.

Accordingly, the embodiment defines a system, whose CEP engine can process input events from a plurality of different external source systems. In other words, all input events are aggregated in one central location, namely the CEP engine, which is thus enabled to produce corresponding complex output events. It is important to note that despite this centralized data aggregation within the CEP engine, the source systems supplying the input events still keep control over which information within their events is to be disclosed to third parties.

This is because the source systems are enabled to specify one or more event-specific disclosure permissions concerning the data in their input events. Based on these event-specific disclosure permission(s), before any output event is sent to an external target system, a security enforcer of the system of the invention removes data from the output event(s) that is not in accordance with the corresponding event-specific disclosure permission(s). In this way, event-specific disclosure permissions attached to certain data fields of the input events from an external source system are maintained throughout the internal processing of the system. Before the output adaptor sends out output events produced by the CEP engine, the security enforcer, in a preceding step, removes all confidential data fields affected by the event-specific disclosure permissions from these output events, as dictated by the external source system(s).

Therefore, the above embodiment differs from existing access modelling approaches in that instance-level security constraints (i.e. event-specific disclosure permission) are dictated by the external source systems themselves, whereas type-level permissions are preferably defined in the central system of the invention and may be applied based on source and destination, as will be described in the following.

According to one aspect of the present invention, the input adaptor is further adapted for adding at least one source-specific disclosure permission to the at least one input event and the security enforcer is further adapted for removing data from the at least one output event that is not in accordance with the at least one source-specific disclosure permission. Accordingly, preferably in addition to the event-specific disclosure permissions defined by the individual sub-systems themselves, also the system of the invention may maintain disclosure permissions, namely source-specific disclosure permissions that define permissions with respect to a particular source system and/or a whole class of source systems.

In another aspect, the input adaptor is further adapted for adding at least one global disclosure permission to the at least one input event and the security enforcer is further adapted for removing data from the at least one output event that is not in accordance with the at least one global disclosure permission. Accordingly, alternatively or in addition to the above-explained types of disclosure permissions, one or more global disclosure permissions may be defined that control disclosure permissions on incoming events regardless of the particular source system, i.e. in the sense of global security policies.

Additionally or alternatively, the output adaptor may be further adapted for adding at least one target-specific disclosure permission to the at least one output event and the security enforcer is further adapted for removing data from the at least one output event that is not in accordance with the at least one target-specific disclosure permission. Accordingly, also for particular target systems or even one or more classes of target systems, target-specific disclosure permissions may be defined and enforced by the system of the invention.

Further, the output adaptor may be adapted for adding at least one global disclosure permission to the at least one output event and the security enforcer may be further adapted for removing data from the at least one output event that is not in accordance with the at least one global disclosure permission.

In yet another aspect of the invention, the input adaptor is further adapted for transforming the at least one input event into a common scheme, while maintaining all event-specific disclosure permissions defined in the at least one input event. Accordingly, the system of the invention is able to aggregate event data from a plurality of different source systems. Since the different source systems may be heterogeneous and adhere to different security concepts, permission formats, and the like, the input adaptor is in this aspect able to translate received input events into a common scheme, i.e. a scheme which is common for all source systems. As a result, the CEP engine of the system is able to process events of all kinds of heterogeneous source systems. Importantly, the individual event-specific disclosure permissions defined in the (heterogeneous) input events are maintained also in the common format, so that no security policies dictated by the source systems are ignored violated.

Also the output adaptor may be further adapted for transforming the at least one output event into a target-specific scheme, while maintaining all event-specific disclosure permissions defined in the corresponding at least one input event. Similar to the above aspect, the output adaptor may translate the output events produced by the CEP engine into a number of different formats in order to be able to route them to all interested (heterogeneous) target systems in a format that can be understood by those systems.

Preferably, the present system's communication with the at least one external source system and/or the communication with the at least one external target system is performed over secure channels. Since the system of the invention is the central location where all security-relevant data from the input events of the various source systems is aggregated, the source systems in this aspect establish a trusted and secure connection to the system in order to keep the confidential data secure when sending it to the system.

As the skilled person will appreciate, the above-described embodiments of the system and its components may be implemented in hardware, software or any combination thereof.

Moreover, a method is provided for secure complex event processing (CEP), wherein the method comprises the steps of receiving at least one input event from at least one external source system, wherein the at least one input event comprises at least one event-specific disclosure permission concerning data of the input event, processing the at least one input event and producing at least one corresponding complex output event, removing data from the at least one output event that is not in accordance with the at least one event-specific disclosure permission defined in the corresponding at least one input event, and sending the at least one output event to at least one external target system.

Further advantageous modifications of embodiments of the method of the invention are defined in the dependent claims.

Lastly, the present invention refers to a computer program (e.g., stored on a non-transitory computer readable storage medium) comprising instructions for implementing any of the above methods.

4. SHORT DESCRIPTION OF THE DRAWINGS

In the following detailed description, presently preferred embodiments of the invention are further described with reference to the following FIGURE:

FIG. 1: A schematic overview of a system for secure complex event processing in accordance with an embodiment of the present invention.

5. DETAILED DESCRIPTION

In the following, a presently preferred embodiment of the invention is described with respect to a system 1 as schematically shown in FIG. 1. The system 1 is preferably a "trusted agent" to the source systems 2 shown in FIG. 1, i.e. the source systems 2 preferably each establish a trust relationship with the system 1 in the sense that the system 1 ensures that only information which is defined disclosable by the respective source system 2 will be made available outside of the system 1, i.e. will be sent to the target systems 3 shown in FIG. 1.

The present invention provides in certain embodiments five levels (each of which will be described in more detail below) on which disclosure permissions may be defined:

1. on data instances per event (event-specific disclosure permissions)
2. on data types per source system 2 (source-specific disclosure permissions)
3. on data types per target system 3 (target-specific disclosure permissions)
4. on data types for the whole system for input data (global disclosure permissions)
5. on data types for the whole system for output data (global disclosure permissions)

After the trust relationship has been established, the source systems 2 send events to the system 1. The system 1, via its CEP engine 20, aggregates the input events and based on rules decides if the input events indicate a noteworthy situation, as it is known in the prior art. If such a case of noteworthiness is detected, notifying output events are produced by the CEP engine and sent to target systems 3. Preferably, the target systems 3 have previously registered themselves with the system 1 as being interested in the occurrence of such noteworthy situations.

The system 1 offers a variety of means to ensure adherence to the security policies dictated by the source systems 2. Firstly, only data that is necessary for detecting noteworthy incidents is sent to the target systems 3. Importantly, the source system 2 can restrict the data it sends with respect to what should be allowed to do with it, namely by including event-specific disclosure permissions in the event data. For example, some data might be necessary to detect noteworthiness and so must be sent to allow the system 1 to enable it to detect the situation, but should not be sent any further (than the system 1). Secondly, the events sent to the system 1 are preferably encrypted for security reasons. A trust relationship exists between the source systems 2 and the system 1, so that general public key cryptography may be used to ensure that only the system 1 can decrypt the events sent by the source systems 2.

Since the system 1 is the place where all the event data of various source systems 2 is aggregated, it will most likely be the primary target for adversaries seeking access to the restricted data. The system 1 thus preferably implements common protection measures in respect to reliability and availability. Also intrusion detection mechanisms may be provided, as it is known in the prior art.

FIG. 1 shows an embodiment of the present invention comprising a collection of source systems 2 each ruling a certain portion of data and sending events to the system 1. On the right hand side of FIG. 3, there is a number of target systems 3 (also called "receptors") that have registered to be informed about certain situations occurring in the system, e.g. resulting from certain events taking place in a certain time window, as defined by rules 200 which are evaluated in the system 1. Also source systems 2 might act as target systems 3. FIG. 1 also shows the system 1's inner structure, especially that at its core is a CEP (Complex Event Processing) engine 20 that evaluates the rules 200 in order to recognize patterns within the input events and to produce corresponding output events, as it is known in the prior art.

To accommodate for the heterogeneity of the source systems 2 sending events and also the target systems 3, the system 1 preferably comprises an ontology 300 defined for each of the source systems 2 and/or target systems 3 to describe the semantics of the data contained in the events. Besides the semantics of the data of the events, the ontologies 300 may also comprise security rules (source-specific and/or target-specific disclosure permissions) for the described data, so as to provide general rules for certain types of data. This allows for source systems 2 to define general disclosure permissions, limiting the usage of certain types of data they send via events to the system 1. Besides these general rules, each event or some of the events might also explicitly contain one or more event-specific disclosure permissions defined by the originating source system 2. This allows for setting disclosure permissions both on instances and on types of data sent in the events to the system 1.

Since the present invention concerns heterogeneous environments, the incoming events of the various source systems 2 may each conform to their own proprietary schema, depending on the respective source system 2. To be interpretable by the CEP engine 20, they must thus be adapted by the input adaptor 10 shown in FIG. 1 to conform to a common schema, which is preferably done based on the ontologies 300. The disclosure permissions are defined by the definitions in the events (event-specific disclosure permissions), in the ontologies 300 (source-specific and/or target-specific disclosure permissions), and in the general security policies 400 (global disclosure permissions) shown in FIG. 1. Event aggregation is performed by the CEP engine 20. The resulting output events are preferably adapted via the output adaptor 30 to match the schema of the respective target system 3 based on the ontologies 300 assigned to the target system 3 and preferably also the permissions defined in the ontologies 300 and/or security policies 400 are added to the output event. Based on the permissions set on the data values in the output events and based on the target system(s) 3 to which the output event will be sent, the security enforcer 35 shown in FIG. 1 then decides which values in the output event(s) must be deleted or, in case that all values are deleted, the complete event might be dropped.

Further, the rules 200 preferably define the queries which are used to perform the aggregation of the events by the CEP engine 20 and they may also define to which target systems 3 the resulting events are sent.

Operation of an Exemplary Embodiment

The following sequence of processing steps defines a preferred order of operations performed by an embodiment of the system 1 and the corresponding method:

1. the input adaptor 10 receives an input event from the source system 2.
   a. Based on which of the source systems 2 has sent the input event, the applicable ontology/ontologies 300 is/are selected.
   b. The applicable ontology/ontologies 300 is/are used to transform the input event data into a common scheme, while maintaining the event-specific disclosure permission(s) defined in the original input event.
   c. The applicable ontology/ontologies 300 is/are used to attach additional source-specific disclosure permissions to the input event.
   d. The global security policy/policies 400 for input events is/are used to attach additional global disclosure permissions to the input event.
2. The input adaptor 10 passes the input event (which is now in the common scheme and supplemented with the disclosure permissions) to the CEP engine 20.
3. The CEP engine 20 receives the input event and, based on the rules 200, checks if any new complex output event(s) should be generated.
4. If a new output event is generated, it is passed to the output adaptor 30. It is noted that the data fields of such an output event preferably comprise all respective disclosure permissions defined on the corresponding data fields of the input event(s).

5. Based on the rules 200, the output adaptor 30 decides to which target system(s) 3 the output event should be passed and for each target system 3 performs the following on the output event:
   a. Based on the target system 3, the applicable ontology/ontologies 300 is/are selected.
   b. The applicable ontology/ontologies 300 is/are used to transform the output event data into the target-specific scheme for the particular target system 3, while maintaining the event-specific disclosure permissions (and preferably all other types of disclosure permissions; see above) defined in the output event.
   c. The applicable ontology/ontologies 300 is/are used to attach additional target-specific disclosure permissions to the output event.
   d. The global security policies 400 for output events are used to attach additional global disclosure permissions to the output event.
   e. The security enforcer 35 removes all data not to be disclosed to the target system 3 from the output event (as defined in the event-specific, source-specific, target-specific and/or global disclosure permissions attached to the output event). If no data is left to make of a useful output event, the whole output event is dropped.
   f. If the output event is not dropped, the output event is sent to the target system 3.

It should be appreciated that various embodiments of the system 1 and the corresponding method may only perform some of the above steps, while omitting others, depending on which types of disclosure permissions (event-specific, source-specific, target-specific and/or global) should be supported.

The creation and/or maintenance of the ontologies 300 and security policies 400 is preferably undertaken by a central authority that is accepted (and trusted) by the source systems 2 and/or target systems 3. Since how the ontologies 300 are defined affects the security interests of the systems 2 and/or 3, they are subject of negotiation. The ontologies 300 concerning in- and outgoing events and the general security policies 400 must be agreed upon between this authority and the source systems and/or target systems concerned.

In a preferred implementation of an embodiment of the present system 1, the security policies 400 are defined in XACML, the ontologies 300 are defined in OWL, the rules 200 are defined in RuleML for CEP and/or the establishment of a secure and trusted connection between the source systems 2 and the system 1 and/or the system 1 and the target systems 3 is done based on data encryption techniques such as SSL.

Exemplary Use Case

In the following, an embodiment of the present invention is described in an exemplary use case. In this use case, a set of computerized business registers act as target systems 3 and would like to be informed when certain situations occur that can only be noticed when looking at multiple source registers (acting as source systems 2) at once. For example, if a certain company applies for opening affiliates in more than one state at once, this might be considered a reason for further analysis. Finding that out, however, requires a data basis containing all incoming applications for opening an affiliate, but these are critical data to the source registers 2 that own these applications.

In the exemplary use case, an input event that is sent from a source register 2 to the system 1 when a company applies for opening an affiliate comprises the following data:

| data name | description | example value |
|---|---|---|
| operation ID | ID of the operation, unique to the register | 12781728 |
| register ID | unique ID of the register where operation is performed | 52653625 |
| company ID | globally unique ID of the company | 54536456 |
| company name | displayname of the company | Software AG |
| company address | address of the company | Uhlandstr. 12 64297 Darmstadt Germany |
| operation type | the type of operation being performed | apply for affiliate |
| Date | date when the operation was performed | 2010-05-04 |
| affiliate location | address where the affiliate is to be opened | Uhlandstr. 13 64297 Darmstadt Germany |
| contact ID | unique ID of the employee handling this operation | 5423 |

A source register 2 sending input events of this type might attach event-specific disclosure permissions to the data sent in the input event. For example, a German source register 2 might want to pass the "contact ID" of the employee handling the operation (see the last line in the above table) to the system 1, but might imply the restriction that this information must only be passed to other target registers 3 within Germany, which results in the following input event being sent from the source register 2 to the system 1:

| data name | value | event-specific disclosure permission |
|---|---|---|
| operation ID | 12781728 | no restrictions |
| register ID | 52653625 | no restrictions |
| company ID | 54536456 | no restrictions |
| company name | Software AG | no restrictions |
| company address | Uhlandstr. 12 64297 Darmstadt Germany | no restrictions |
| operation type | apply for affiliate | no restrictions |
| date | 2010-05-04 | no restrictions |
| affiliate location | Uhlandstr. 13 64297 Darmstadt Germany | no restrictions |
| contact ID | 5423 | only pass to target systems 3 which are business registers in Germany |

As can be seen, the source register 2 has attached an event-specific disclosure permission to the "contact ID" data element of the input event, before this input event is sent to the system 1.

Further, in this example the ontology 300 modelling the events which are used for applying for new affiliates comprises a target-specific disclosure permission which defines that the event data "company name", "company address" and "company ID" (see the above table) must not be exposed to other target business registers 3.

Further, there is in this example a rule 200 which defines that if a certain company applies for opening affiliates more than three times within one month, then all registers where the applications have been made need to be informed about this application.

The resulting output event that is generated based on the rule 200 and the ontology 300 thus only contains the following data fields: "operation ID", "register ID", "operation type", "date", "affiliate location", and possibly "contact ID", since the ontology-based disclosure permissions will prevent the "company name", "company address", and "company ID" from being sent to external registers 3. However, since the "operation ID" and "register ID" are included in the output event, the registers 3 can then contact the respective registers 2 and with the "operation ID" request additional information. Thereby enabling the detection of the situation that multiple affiliates haven been applied for, but the details require additional requests, therefore allowing the business registers 2 to decide which additional information they can disclose.

Besides the output events being sent to the other business registers 3, there might be an additional rule 200 that triggers a new event being sent to a global address registration service every time a new affiliate is applied for. For this registration service, which is a target system 3 that is not a business register, the above-mentioned ontology-based (source- and/or target specific) disclosure permissions do not apply. Instead, there might be a security policy 400 defined explicitly for the registration service as target system 3, defining that only "company name" and "affiliate location" may be disclosed to this target system, thereby making the addresses of all companies' affiliates available without additional information, e.g. for keeping a global address list up to date.

In summary, the present invention provides a framework that enables the modelling of disclosure permissions/restrictions on various levels, which are preferably not applied during event evaluation. Instead, since a trusted evaluation context is assumed in the form of the provided system, the disclosure permissions rather apply to the result, i.e. the output event(s), after the evaluation by the CEP engine and are enforced based on the result and the recipient (target system) to which the result is sent.

GLOSSARY

The terms event, complex event processing (CEP), and rule as used herein adhere to the definitions provided in the "Event Processing Glossary" by the Event-Processing Technical Society (EP-TS), (http://www.epts.com/component/option,com_docman/task,doc_download/gid,66/Itemid,84/).

The term ontology as used herein adheres to the definition by Tom Gruber in the "*Encyclopedia of Database Systems*", Ling Liu and M. Tamer Özsu (Eds.), Springer-Verlag, 2009 (http://tomgruber.org/writing/ontology-definition-2007.htm). Further information on ontologies in the context of interoperability of distributed computing systems may be found in "*BRITE: Interoperabilität durch Ontologien*" by Dr. Michael Gesmann (Koblenzer Wirtschaftsinformatik-Forum, Jun. 19, 2008) and in Van Elst et al.: "*Business Register Interoperability Throughout Europe: The BRITE Project*" (http://citeseerx.ist.psu.edu/viewdoc/download?doi=10.1.1.68.446&rep=rep1&type=pdf).

The term security policy as used herein describes a set of rules that defines the desired information protection security in the sense of which information may be disclosed to which instances under which circumstances.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a non-transitory computer readable storage medium or the like.

The invention claimed is:

1. A system for secure complex event processing (CEP), comprising:
   a. an input adaptor configured to receive at least one input event from at least one external source system, wherein the at least one input event comprises at least one event-specific disclosure permission concerning data of the input event;
   b. a CEP engine configured to process the at least one input event and to produce at least one corresponding complex output event;
   c. a security enforcer configured to remove data from the at least one output event that is not in accordance with the at least one event-specific disclosure permission defined in the corresponding at least one input event; and
   d. an output adaptor configured to send the at least one output event to at least one external target system.

2. The system of claim 1,
   wherein the input adaptor is further configured to add at least one source-specific disclosure permission to the at least one input event; and
   wherein the security enforcer is further configured to remove data from the at least one output event that is not in accordance with the at least one source-specific disclosure permission.

3. The system of claim 1,
   wherein the input adaptor is further configured to add at least one global disclosure permission to the at least one input event; and
   wherein the security enforcer is further configured to remove data from the at least one output event that is not in accordance with the at least one global disclosure permission.

4. The system of claim 1,
   wherein the output adaptor is further configured to add at least one target-specific disclosure permission to the at least one output event; and
   wherein the security enforcer is further configured to remove data from the at least one output event that is not in accordance with the at least one target-specific disclosure permission.

5. The system of claim 1,
   wherein the output adaptor is further configured to add at least one global disclosure permission to the at least one output event; and
   wherein the security enforcer is further configured to remove data from the at least one output event that is not in accordance with the at least one global disclosure permission.

6. The system of claim 1, wherein the input adaptor is further configured to transform the at least one input event into a common scheme, while maintaining all event-specific disclosure permissions defined in the at least one input event.

7. The system of claim 6, wherein the output adaptor is further configured to transform the at least one output event into a target-specific scheme, while maintaining all event-specific disclosure permissions defined in the corresponding at least one input event.

8. The system of claim 1, wherein the communication with the at least one external source system and/or the communication with the at least one external target system is performed over secure channels.

9. A method for secure complex event processing (CEP), the method comprising:
a. receiving at least one input event from at least one external source system, wherein the at least one input event comprises at least one event-specific disclosure permission concerning data of the input event;
b. processing the at least one input event and producing at least one corresponding complex output event;
c. removing data from the at least one output event that is not in accordance with the at least one event-specific disclosure permission defined in the corresponding at least one input event; and
d. sending the at least one output event to at least one external target system.

10. The method of claim 9, further comprising:
adding at least one source-specific disclosure permission to the at least one input event; and
removing data from the at least one output event that is not in accordance with the at least one source-specific disclosure permission.

11. The method of claim 9, further comprising:
adding at least one global disclosure permission to the at least one input event; and
removing data from the at least one output event that is not in accordance with the at least one global disclosure permission.

12. The method of claim 9, further comprising:
adding at least one target-specific disclosure permission to the at least one output event; and
removing data from the at least one output event that is not in accordance with the at least one target-specific disclosure permission.

13. The method of claim 9, further comprising:
adding at least one global disclosure permission to the at least one output event; and
removing data from the at least one output event that is not in accordance with the at least one global disclosure permission.

14. A non-transitory computer readable storage medium tangibly storing a computer program comprising instructions that, when executed by a computer, implement a method of claim 9.

* * * * *